3,093,551
PRODUCTION OF NISIN
Ronald H. Hall, Yeovil, England, assignor to Aplin & Barrett Limited, Somerset, England, a British company
No Drawing. Filed Mar. 17, 1961, Ser. No. 96,371
Claims priority, application Great Britain Apr. 8, 1960
1 Claim. (Cl. 195—96)

This invention relates to the production of nisin.

Nisin is the name given to the inhibitory substances or substance produced by growing a culture medium a nisin-producing strain of *Streptococcus lactis*. Nisis is known to be inhibitory against various micro-organisms, including many species of the organism Clostridium.

In accordance with the invention, a culture medium for producing nisin is produced by treating milk with a proteolytic enzyme to digest a part of the protein contained therein and to cause precipitation of unwanted protein, separating the precipitated protein and treating the residual liquid to inactivate or destroy the enzyme. The invention also includes as a further feature the production of nisin by growing *Streptococcus lactis* in a culture medium so produced.

The term "milk" as used herein includes whole or skim milk and milk reconstituted from whole or skim milk powder to varying solid contents, and evaporated milk.

Examples of suitable proteolytic enzymes for use in the process are papain, rennin, pepsin or trypsin.

The precipitation of the unwanted protein may take place due to the change of pH which accompanies digestion or in some cases due to the pH at which digestion is carried out. Certain proteolytic enzymes, such as rennin, also have a coagulating effect on the undigested protein. The undigested protein may be separated by conventional methods such as centrifuging.

The inactivation of the enzyme after digestion and the precipitation of at least part of the unwanted and undigested protein may be simultaneously brought about by heating the milk after digestion, precipitation. The precipitated curd may be removed by settling and siphoning off the clear liquid or by centrifuging.

When using raw milk as a starting material, heat treatment at a temperature above boiling point is preferably effected before adding the enzyme both to sterilise the milk and to denature the protein; when employing milk reconstituted from whole or skim milk powder however, such pre-heating is unnecessary.

The conditions necessary for the growth in the new culture medium of *Streptococcus lactis* are those conventionally employed, and the concentration and/or isolation of the nisin may be performed by conventional means. Thus the nisin may be recovered by passing air through the nisin-containing culture medium, if desired after the addition of a small quantity, not exceeding 0.1% by weight, of a surface active agent, collecting the foam, adjusting the pH to 2.5, adding 25% of sodium chloride, recovering the precipitated solid by centrifuging and then freeze drying.

The invention is further illustrated by the following examples.

Example 1

4540 litres of skim milk are rapidly heated to 105° C. held at that temperature for 5–15 seconds and then cooled to 37° C., 450 gms. of papain (B.P.C.) suspended in a little sterile milk are added to the liquid which is adjusted to pH 6.5. Two litres of toluene are added to suppress bacterial growth. Digestion is continued for 20 hours at 37° C. and the liquid is then heated to 100° C. to inactivate the enzyme. The solids are separated from the liquid and discarded. The liquid is sterilised at 115° C. and inoculated with a nisin-producing strain of *Streptococcus lactis*. After growth the nisin may be entracted by known means, or as specified above.

Example 2

454 kg. of dried skim milk powder is reconstituted in water to give 20% total solids, adjusted to pH 6.5, heated to 70° C. and 450 gms. of papain (B.P.C.) suspended in a little water, added. The digestion is continued at 70° C. for 5 hours, and the bulk is then heated to 100° C. to inactivate the enzyme. The liquid is diluted with 2270 litres of water and the procedure of Example 1 is then followed.

Example 3

4540 litres of skim milk are acidified to pH 4.7 with hydrochloric acid and the precipitated casein separated from the whey (3400 litres) as a slurry (1140 litres). 450 gms. of papain are added to 900 litres of the casein slurry which has been heated to 37° C. and adjusted to a pH of 6.5, and 400 ml. of toluene added (the remaining 240 litres of casein slurry are not required for this process and may be treated as desired e.g. dried for animal feed, etc.). Digestion is allowed to continue at this temperature for 40 hours, and any remaining solids are then removed and the clear liquid added to the whey. The mixture is then sterilised and inoculated with a nisin producing strain of *Streptococcus lactis*.

Example 4

4540 litres of skim milk are heated to 105° C. cooled to 37° C., and 500 gms. of pepsin B.P.C., suspended in a little sterile milk, added. The pH of the mixture is adjusted to 1.5 with 50% hydrochloric acid and the temperature maintained at 37° C. for 12 hours. The mixture is then heated to 100° C. to inactivate the enzyme, and the solids separated and discarded. The liquid is sterilised at 115° C. and inoculated with a nisin-producing strain of *Streptococcus lactis*. After growth the nisin may be extracted by known means, or as specified above.

Example 5

1350 litres of evaporated skim milk of 30% total solids, is heated to 37° C., the pH adjusted to 7.8 with caustic soda and 500 gms. of trypsin and a little toluene added. The temperature is maintained at 37° C. for 6 hours. The pH is then adjusted to 4.5 with hydrochloric acid and excess solid removed. The liquid portion is diluted to give a final bulk of 4500 litres and adjusted to a pH of 6.5 with caustic soda. The liquid is sterilised at 115° C., inactivation of the enzyme also occurring under these conditions and inoculated with a nisin-producing strain of *Streptococcus lactis*. After growth the nisin may be extracted by known means or as specified above.

By removing the undigested protein as described above the subsequent working up of the nisin is facilitated.

I claim:

A process of producing nisin which comprises:
 (a) preparing a culture medium by treating milk with a proteolytic enzyme to digest a part of the protein contained therein and to cause precipitation of protien, heating the liquid containing the enzyme to inactivate the enzyme, and separating at least the protein precipitated during said enzyme treatment; and
 (b) inoculating the culture medium comprising the liquid remaining after the heating and separation steps with a nisin-producing organism.

References Cited in the file of this patent

UNITED STATES PATENTS

| 2,838,443 | Gillespie | June 10, 1958 |
|---|---|---|
| 2,935,503 | Hawley et al. | May 3, 1960 |

FOREIGN PATENTS

| 683,423 | Great Britain | Nov. 26, 1952 |
|---|---|---|